No. 668,787. Patented Feb. 26, 1901.
E. A. VÉTILLARD & P. E. SCHERDING, Jr.
APPARATUS FOR FEEDING LIQUID AND SOLID PULVERIZED FUEL INTO FURNACES.
(Application filed Nov. 24, 1899.)
(No Model.) 2 Sheets—Sheet 1.

Witnesses
J. G. Hinkel
Howard M. Gillman, Jr.

Inventors
Ernest Armand Vétillard
Philippe Eugène Scherding
By Foster & Freeman
Attorneys No. 668,787. Patented Feb. 26, 1901.
E. A. VÉTILLARD & P. E. SCHERDING, Jr.
APPARATUS FOR FEEDING LIQUID AND SOLID PULVERIZED FUEL INTO FURNACES.
(Application filed Nov. 24, 1899.)
(No Model.) 2 Sheets—Sheet 2.

UNITED STATES PATENT OFFICE.

ERNEST ARMAND VÉTILLARD AND PHILIPPE EUGÈNE SCHERDING, JR., OF PARIS, FRANCE.

APPARATUS FOR FEEDING LIQUID AND SOLID PULVERIZED FUEL INTO FURNACES.

SPECIFICATION forming part of Letters Patent No. 668,787, dated February 26, 1901.

Application filed November 24, 1899. Serial No. 738,194. (No model.)

*To all whom it may concern:*

Be it known that we, ERNEST ARMAND VÉTILLARD, residing at 7 Rue Leneveux, and PHILIPPE EUGÈNE SCHERDING, Jr., residing at 22 Rue du Bouloi, Paris, France, citizens of the French Republic, have invented a new and useful Apparatus for Feeding Liquid and Solid Pulverized Fuel into Furnaces, of which the following is a specification.

This invention relates to a fuel-feeding apparatus for furnaces, more especially designed for use in steam-generator furnaces, although it may be applied to any existing furnace and particularly where a supply of steam or compressed air is available either directly in the case of boiler-furnaces or indirectly in other cases.

The object of the invention is to provide an apparatus of simple construction by which a mixture of liquid fuel, pulverized solid fuel, steam, and air may be fed to a furnace in the best condition for effective combustion.

The invention will be fully described hereinafter, reference being had to the accompanying drawings, in which—

Figure 1:
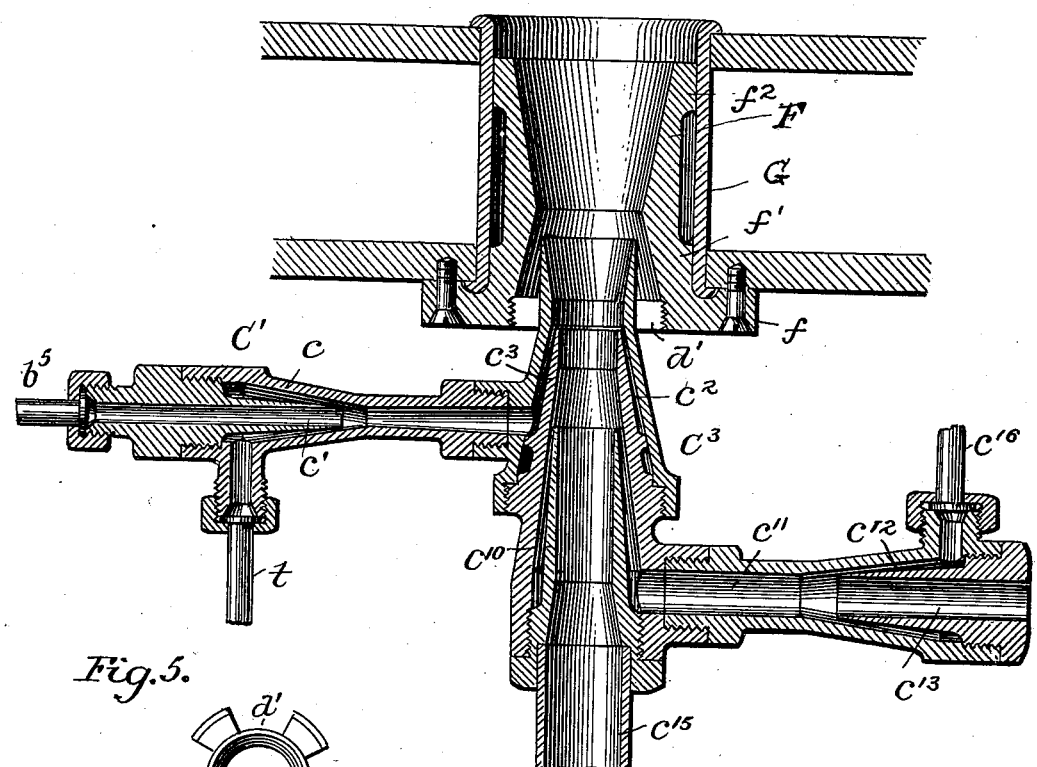
Figure 5:
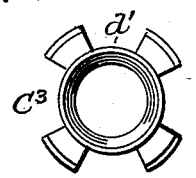
Figure 2:
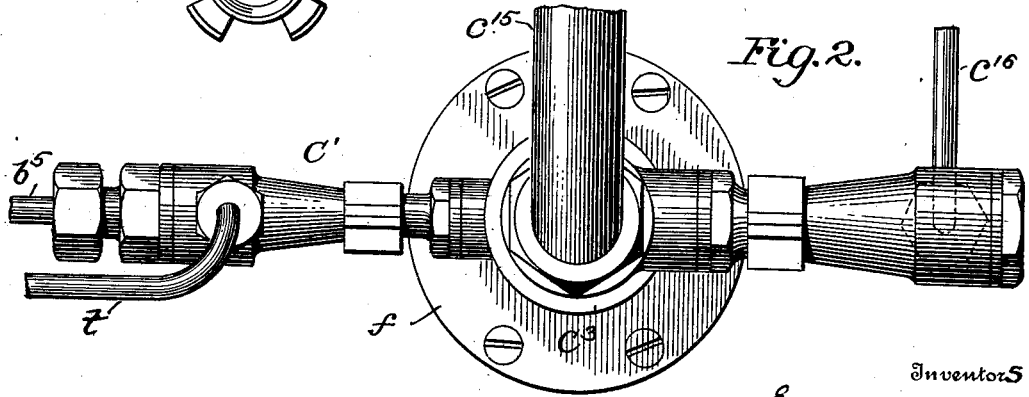
Figure 3:
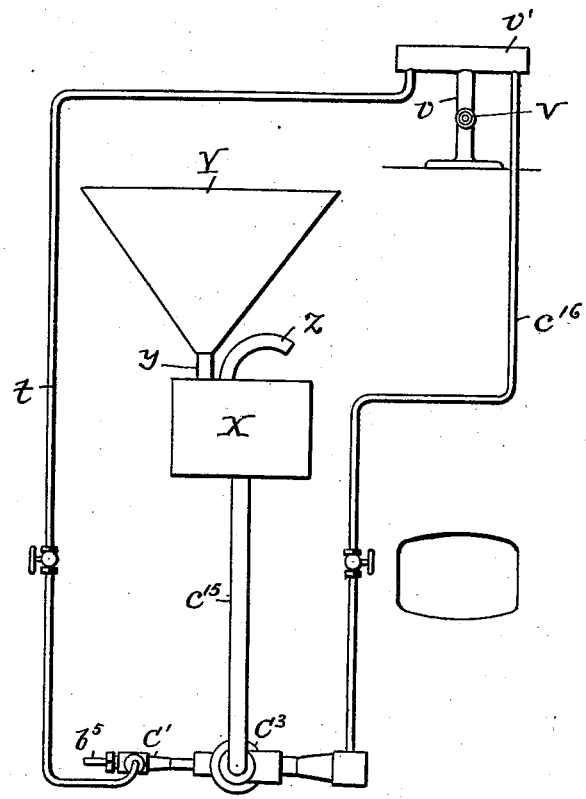
Figure 4:
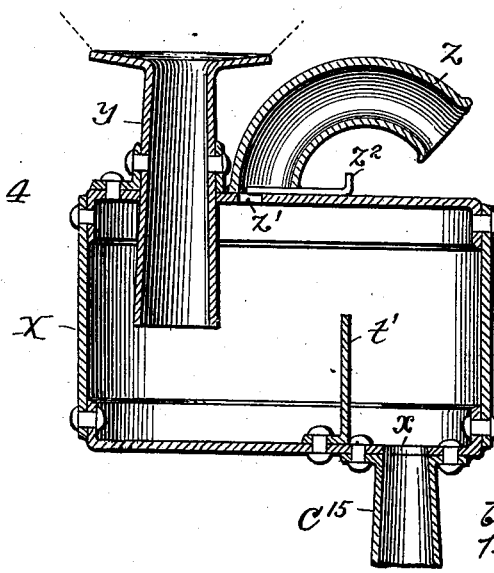

Figure 1 is a sectional plan view of the injecting apparatus for feeding both liquid and pulverized solid fuel mixed with steam and air. Fig. 2 is a front view of the same. Fig. 3 is a diagram showing the application of our invention to a boiler-furnace. Fig. 4 is a vertical section of the suction stirring-box for the pulverized solid fuel, and Fig. 5 is a detail part.

An injector $C'$ has connected to it a pipe $b^5$, through which liquid fuel is supplied from a reservoir. (Not shown.) A pipe $t$ is also connected to the side of the injector and conveys steam from a source of supply to the annular space $c$ of the injector, and thereby draws the liquid fuel through the central tube $c'$ of the injector, and the mixed steam and liquid fuel passes into the annular space $c^2$ of a second injector $C^3$, the latter being perpendicular to the injector $C'$. The cone $c^3$ of the injector $C^3$ contains another cone $c^{10}$ in the same axis, and a tube $c^{11}$ communicates with the annular space between these cones. The tube $c^{11}$ also communicates with an injector, the annular space $c^{12}$ of which receives steam from a pipe $c^{16}$, thereby drawing in air through the tube $c^{13}$, which is open to the atmosphere at one end, and the mixture of steam and air is delivered into the annular space between the cones $c^3$ and $c^{10}$ through the tube $c^{11}$. A pipe $c^{15}$, in communication with the suction stirring-box X and the hopper containing the pulverized fuel, is coupled to the central orifice of the cone $c^{10}$. The stream of steam and air reaching the apparatus through the annular space between the cones $c^3$ and $c^{10}$ produces an air-suction through the pipe $c^{15}$, which air carries the pulverized fuel and injects it into the furnace simultaneously with the liquid fuel.

It should be observed that the pulverized fuel is in the axis of the stream and that therefore its combustion is greatly helped by the presence of the liquid gasified fuel surrounding it, this to such an extent that the combustion is perfectly smokeless.

The pipe $c^{15}$ communicates with the bottom of the box X, already mentioned, Figs. 3 and 4, situated below the hopper Y, Fig. 3, containing the fuel. The hopper Y communicates with the box X by a tube $y$, projecting through the cover to about half the height of the box and placed at the opposite side to the tube $x$ of the pipe $c^{15}$. Near the tube $y$ is another tube $z$, whose inlet $z'$ through the cover of the box is contracted and whose area may be altered, if necessary, by a valve $z^2$. There is also a transverse partition or baffle-plate $t'$ between the inlet $z'$ and the outlet $x$, rising from the bottom to about half the height of the box.

It will be easily understood that the suction set up in the pipe $c^{15}$ by the injector draws pulverized fuel from the hopper Y and air through the tube $z$. By reason of the arrangement of the partition or baffle-plate $t'$ and its height, the arrangement and length of the tube $y$, and the arrangement and area of the air-inlet $z'$ an intimate stirring of the solid particles with the air is produced, so that a stream of air carrying the pulverized fuel reaches the injector by the pipe $c^{15}$. The proportioning of the mixture can easily be varied by means of the device just described.

The injector $C^3$ projects into a tubular body F, the bore of which, as shown in Fig. 1, flares toward each end. The body F is furnished with two cylindrical bearings $f'$ $f^2$, which fit tightly in a tube G, secured in the furnace-front. It is also provided with a flange $f$ at its outer end, which is secured by screws to the furnace-front.

The delivery end of the injector $C^3$ is provided with a collar which screws into the outer end of the tubular body F. This collar is recessed in its periphery, as indicated by $d'$, (see Fig. 5,) through which recesses air passes to the interior of the body F.

One means of supplying steam to the injectors is illustrated in Fig. 3. A pipe $v$ communicates with the steam-space of the boiler and is provided with a valve V and a head $v'$. From this head the pipes $t$ and $c^{16}$ lead to their respective injectors, and each pipe is provided with a valve, as shown, in order that steam may be shut off from either injector, if desired.

While we have illustrated only one injecting apparatus applied to the furnace, it is of course to be understood that two or more may be applied in a similar manner.

Having described the invention, we claim—

1. In an apparatus for feeding fuel to a furnace, the combination with an injector $C'$, a liquid-fuel-supply pipe and a steam-supply pipe leading into the injector, an injector $C^3$ communicating with the furnace and having its axis perpendicular to the axis of the injector $C'$ and having an annular space into which the mixture of steam and liquid fuel is delivered from the injector $C'$, a cone $c^{10}$ supported within the cone $c^3$ of the injector $C^3$ with an annular space between them, a pipe to supply pulverized solid fuel connected to the cone $c^{10}$, and means to supply a mixture of steam and air to the annular space between said cones, substantially as set forth.

2. In an apparatus for feeding fuel to a furnace, the combination with an injector $C'$, a liquid-fuel-supply pipe and a steam-supply pipe leading into the injector, an injector $C^3$ communicating with the furnace and having its axis perpendicular to the axis of the injector $C'$ and having an annular space into which the mixture of steam and liquid fuel is delivered from the injector $C'$, a cone $c^{10}$ supported within the cone $c^3$ of the injector $C^3$ with an annular space between them, a pipe to supply pulverized solid fuel connected to the cone $c^{10}$, means to supply a mixture of steam and air to the annular space between said cones, and means to supply an annular current of air surrounding the mixture of liquid and pulverized solid fuel, steam and air which issues from the discharge end of the injector $C^3$, substantially as set forth.

3. In an apparatus for supplying pulverized solid fuel to a furnace, the combination of a hopper, a closed box X, a pipe leading from the hopper through the top of the box near one side thereof and terminating about midway the depth of said box, a discharge-pipe leading from the bottom of the box near the opposite side thereof, a baffle-plate secured to the bottom of the box and extending upwardly in a plane between the inlet and exit openings to a height substantially level with the lower end of the inlet-pipe, an air-supply pipe secured to the top of the box and communicating with the interior through a contracted opening, and an injector with which said discharge-pipe communicates, substantially as set forth.

4. In an apparatus for supplying pulverized solid fuel to a furnace, the combination of a closed box X, a baffle-plate $t'$ within the box, an inlet-pipe $y$ for the fuel on one side of the plate, an outlet-pipe $x$ for the fuel on the other side of the plate, an injector to which the outlet-pipe is connected, and an air-supply pipe $z$ having valved communication with the interior of the box, substantially as set forth.

In testimony whereof we have signed our names to this specification in the presence of two subscribing witnesses.

ERNEST ARMAND VÉTILLARD.
PHILIPPE EUGÈNE SCHERDING, JUNR.

Witnesses:
CHARLES VICTOR THIERRY,
EDWARD P. MACLEAN.